(12) United States Patent
Cohen et al.

(10) Patent No.: US 10,917,407 B2
(45) Date of Patent: Feb. 9, 2021

(54) METHOD FOR CONTROLLING AN ELECTRONIC DISPLAY

(71) Applicant: XpoNet Corp., Orlando, FL (US)

(72) Inventors: Joshua Cohen, Baltimore, MD (US); Michael Coupet, Sterling, VA (US); Gabriel Gilligan, Pound Ridge, NY (US)

(73) Assignee: XpoNet, Orlando, FL (US)

( * ) Notice: Subject to any disclaimer, the term of this patent is extended or adjusted under 35 U.S.C. 154(b) by 177 days.

(21) Appl. No.: 16/190,448

(22) Filed: Nov. 14, 2018

(65) Prior Publication Data

US 2019/0149551 A1 May 16, 2019

Related U.S. Application Data

(60) Provisional application No. 62/585,887, filed on Nov. 14, 2017.

(51) Int. Cl.
*G06F 3/14* (2006.01)
*H04L 29/06* (2006.01)
*H04W 12/08* (2009.01)

(52) U.S. Cl.
CPC .............. *H04L 63/101* (2013.01); *G06F 3/14* (2013.01); *H04W 12/0804* (2019.01); *G06F 2211/005* (2013.01)

(58) Field of Classification Search
CPC ..... H04L 63/101; H04L 12/0804; G06F 3/14; G06F 2211/005
See application file for complete search history.

(56) References Cited

U.S. PATENT DOCUMENTS

| | | |
|---|---|---|
| 8,897,737 B2 | 11/2014 | Hahn et al. |
| 2007/0136133 A1 | 6/2007 | Li |
| 2007/0252891 A1 | 11/2007 | Gurley |
| 2009/0144157 A1 | 6/2009 | Saracino et al. |
| 2009/0215436 A1 | 8/2009 | Howard et al. |

(Continued)

FOREIGN PATENT DOCUMENTS

WO 2012/001704 A1 1/2012

OTHER PUBLICATIONS

"Digital Signage and SMS", http://mediasinage.com/html/sms_digital_signage.html (accessed Dec. 6, 2017).

*Primary Examiner* — Ellen Tran
(74) *Attorney, Agent, or Firm* — Venable LLP

(57) ABSTRACT

A method for providing extended control of media displayed on individual and groups of digital signs for use in near realtime scenarios by leveraging the short message service (SMS) as a transport mechanism to enable immediate temporary or permanent changes to displayed media shown on digital signage. Each SMS message utilizes command codes and variable arguments to query for information to be returned or indicate actions to be performed, providing a subset of the data and control mechanisms exposed by the digital signage management service. SMS endpoints are authenticated against a whitelist also containing a list of valid digital signage management groups with associated message routing information. Data requests require no additional validation, while action requests include a secondary verification as a protection against caller ID spoofing.

13 Claims, 4 Drawing Sheets

(56) References Cited

U.S. PATENT DOCUMENTS

2010/0118200 A1     5/2010  Gelman et al.
2011/0169634 A1*    7/2011  Raj ..................... G08B 27/008
                                                        340/540
2016/0345066 A1*   11/2016  Barker ............. H04N 21/23439

* cited by examiner

METHOD FOR CONTROLLING AN ELECTRONIC DISPLAY

CROSS REFERENCE TO RELATED APPLICATIONS

This application claims the benefit under 35 U.S.C. § 119(e) of U.S. Provisional Patent Application No. 62/585,887, filed Nov. 14, 2017, and titled "Method for Near Realtime Routed Bidirectional Communication Between Single or Multi-Site Digital Signage Management Services and Cellular Devices," the entirety of which are incorporated herein by reference.

FIELD OF THE INVENTION

This invention relates to a system for administering over an electronic display.

BACKGROUND OF THE INVENTION

Electronic displays have become increasingly affordable and commonplace, resulting in their growing presence in business, retail, transportation, sporting arenas, advertising, and other environments. Electronic displays are often favored over static displays (e.g., printed signage or billboards) due to their ability to change the content displayed thereon.

However, such benefit is hampered by current limitations of electronic displays in providing efficient, yet secure, management access by an administrator. For instance, stand-alone electronic displays lack remote connectivity and typically require the administrator's physical presence to manage the device. Meanwhile, electronic displays connected to a communications network utilize proprietary and cumbersome interfaces, requiring an administrator to constantly carry around specialized equipment or maintain access to a web browser. These limitations cause difficulties for an administrator to quickly access an electronic display and perform administrative functions thereon.

SUMMARY OF THE INVENTION

The embodiments of the present invention provide an approach for an administrator to quickly and efficiently manage one or more electronic displays.

In one aspect, the invention relates to an apparatus for controlling a display, comprising a processor, at least one network interface, and a memory, wherein the processor is configured to: receive, from a client device via the at least one network interface, a first message containing text content, the text content representing an administration request to perform an administration function on the display, the administration request being one of at least two types including a first type and a second type, determine whether or not the client device is an authorized device, when the client device is determined to be an authorized device and the administration request is of the first type: transmit, to the client device via the at least one network interface, a second message requesting verification of an administrator, receive, from the client device via the at least one network interface, a third message containing content to verify the administrator, determine whether or not the administrator is verified, based on the third message, and if the administrator is verified based on the third message, transmit a command to perform the administration function on the display in accordance with the administration request, and when the client device is determined to be an authorized device and the administration request is of the second type: transmit the command to perform the administration function on the display in accordance with the administration request, without determining whether or not the administrator is verified.

These and other aspects of the invention will become apparent from the following disclosure.

DETAILED DESCRIPTION OF THE PREFERRED EMBODIMENTS

Figure 1:
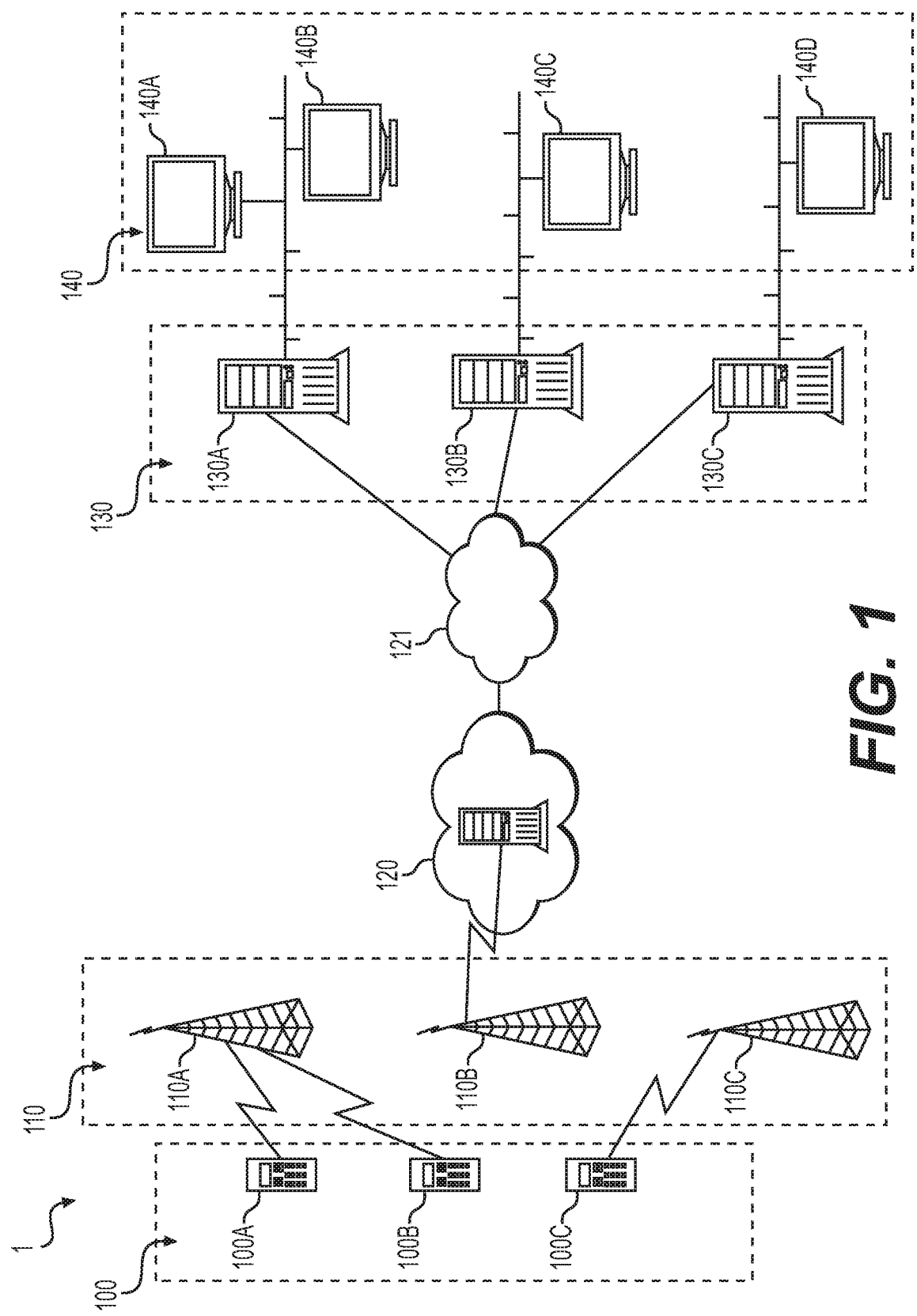
FIG. 1 shows a system for remotely administering an electronic display, according to a preferred embodiment of the invention.

FIG. 1 illustrates a system 1 for remotely managing an electronic display. The system 1 includes one or more short message service (SMS)-enabled devices 100 (e.g., 100A, 100B, 100C), one or more cellular networks 110 (e.g., 110A, 110B, 110C), a backend server 120, one or more display servers 130 (e.g., 130A, 130B, 130C), and one or more electronic displays 140 (e.g., 140A, 140B, 140C, 140D)

Each SMS-enabled device 100 includes a processor, a memory, a user input component (e.g., keyboard, touchscreen, etc.), a user output component (e.g., display screen), and a telecommunications interface. Each SMS-enabled device 100 has the functionality to send and receive SMS messages using its telecommunications interface. In a preferred embodiment, an SMS-enabled device 100 is a cellular telephone (e.g., dumb phone, feature phone, or smartphone). However, it will be appreciated that an SMS-enabled device 100 may be a tablet, computer, two-way pager, vehicle, or any other device capable of transmitting and receiving SMS messages. Each SMS-enabled device 100 is connected to a cellular network 110, and sends and receives SMS messages via the respective cellular network 110. Each cellular network 110 is a network utilizing cellular technology for communication, and is typically operated by a mobile network operator (or "mobile carrier"). Each cellular network 110 incorporates one or more cellular communication technologies such as, but not limited to, GSM, CDMA, TDMA, EDGE, EV-DO, HSPA, and LTE. It will be appreciated that each SMS-enabled device 100 may utilize the same cellular network as, or a different cellular network from, any other SMS-enabled device 100. It will also be appreciated that the system 1 may incorporate alternative wired or wireless telecommunications technologies other than cellular technologies (e.g., WiFi), without deviating from the scope of the invention. It will further be appreciated that the system 1 may utilize alternative message services other than SMS (e.g., Multimedia Messaging Service (MMS) or private messaging services), including those operating over a wired or wireless (e.g., WiFi) connection, without deviating from the scope of the invention.

The backend server 120 includes a processor, a memory, and at least one telecommunications interface. The backend server 120 executes software for performing various functions, such as a database server, web server, and SMS interface. The backend server 120 functions as an access point for the SMS-enabled devices 100 to access display servers 130 and displays 140. The backend server 120 is also connected to one or more of the cellular networks 110, and utilizes the connected cellular network(s) 110 to exchange SMS messages with the SMS-enabled devices 100. However, it will be appreciated that the backend server 120 may be connected to the cellular network 110 using a connection other than a cellular connection, such as a wired or wireless (e.g., WiFi) connection. It will further be appreciated that the backend server 120 may incorporate a sub-system other than, or in addition to, the cellular network 110 to establish connectivity to one or more messaging services.

It will be appreciated that the backend server 120 may utilize the same cellular network as, or a different cellular network from, any of the SMS-enabled devices 100. It will be further appreciated that the backend server 120 may be configured as a single server or as a cluster of multiple servers. Preferably, the backend server 120 is configured as a cloud server. It will additionally be appreciated that intercommunication between cellular networks 110 may take place according to known protocols, to effectively direct SMS messages to their intended destination.

The backend server 120 is connected to the display servers 130 via a network connection 121. Preferably, the network connection 121 is the Internet. However, it will be appreciated that the network connection 121 may be a virtual private network (VPN), a dedicated network link, a cellular network, or any other connection capable of transmitting and receiving data. It will also be appreciated that the network connection 121 may be implemented as a group of individual network connections, with each individual network connection being of the same, or different, configuration or type as another individual network connection.

The display server 130 includes a processor, a memory, and at least one telecommunications interface. One of the display server's 130 telecommunications interfaces is connected to the network connection 121 to communicate with the backend server 120.

Each display server 130 is connected to one or more electronic displays 140. The display server 130 executes software for communicating with the backend server 120 and for controlling the connected displays 140.

Each display 140 contains a processor and memory, or circuitry, and one or more display screens for displaying content thereon. Each display screen is preferably configured as a two-dimensional array of color display pixels, with the capability to display graphics and/or text. In an alternative embodiment, the display screen may be a grayscale or monochrome display, a scrolling text display, or a display based on multi-segment characters. Regardless, it will be appreciated that any display screen capable of displaying visual content may be utilized with the invention. Each display is unrestricted in size, but preferably ranges from the size of a portable tablet size to the size of a billboard.

The data connections between a display 140 and a display server 130 may be a wired or wireless connection, and may constitute one of the at least one telecommunications interface of the display server 130. Examples of preferred wired connections between a display server 130 and a display 140 include USB, Ethernet, Thunderbolt, serial port, parallel port, FireWire, VGA, HDMI, DVI, and DisplayPort. However, it will be appreciated that any wired format capable of transferring digital data may be used with the invention. Examples of preferred wireless connections between a display server 130 and a display 140 include WiFi, Bluetooth, NFC, and Infrared, but it will be appreciated that any wireless format capable of transferring digital data may be used with the invention. In light of the above description, it will be appreciated that implementations of the display 140 covered by the present invention include at least (i) a conventional television or monitor that communicates with the display server 130 via a display interface (e.g., HDMI) and (ii) a television or monitor combined with a computing component integrated with, or external to, the television/monitor, the computing component communicating with the television/monitor via a display interface and communicating with the display server 130 using a data interface.

It will also be appreciated that a single display server 130 may be connected to multiple displays 140. For instance, in a retail store, a single display server 130 may serve a first display located street-side, a second display mounted to the store exterior window, and a third display located inside of the store. FIG. 1 depicts an example of such configuration, with display server 130A serving both displays 140A and 140B. Additionally, while FIG. 1 illustrates each display server 130 as a separate component from a display 140, it will be appreciated that a display server 130 may be integrated with a display 140 as a single unit.

Figure 2A:
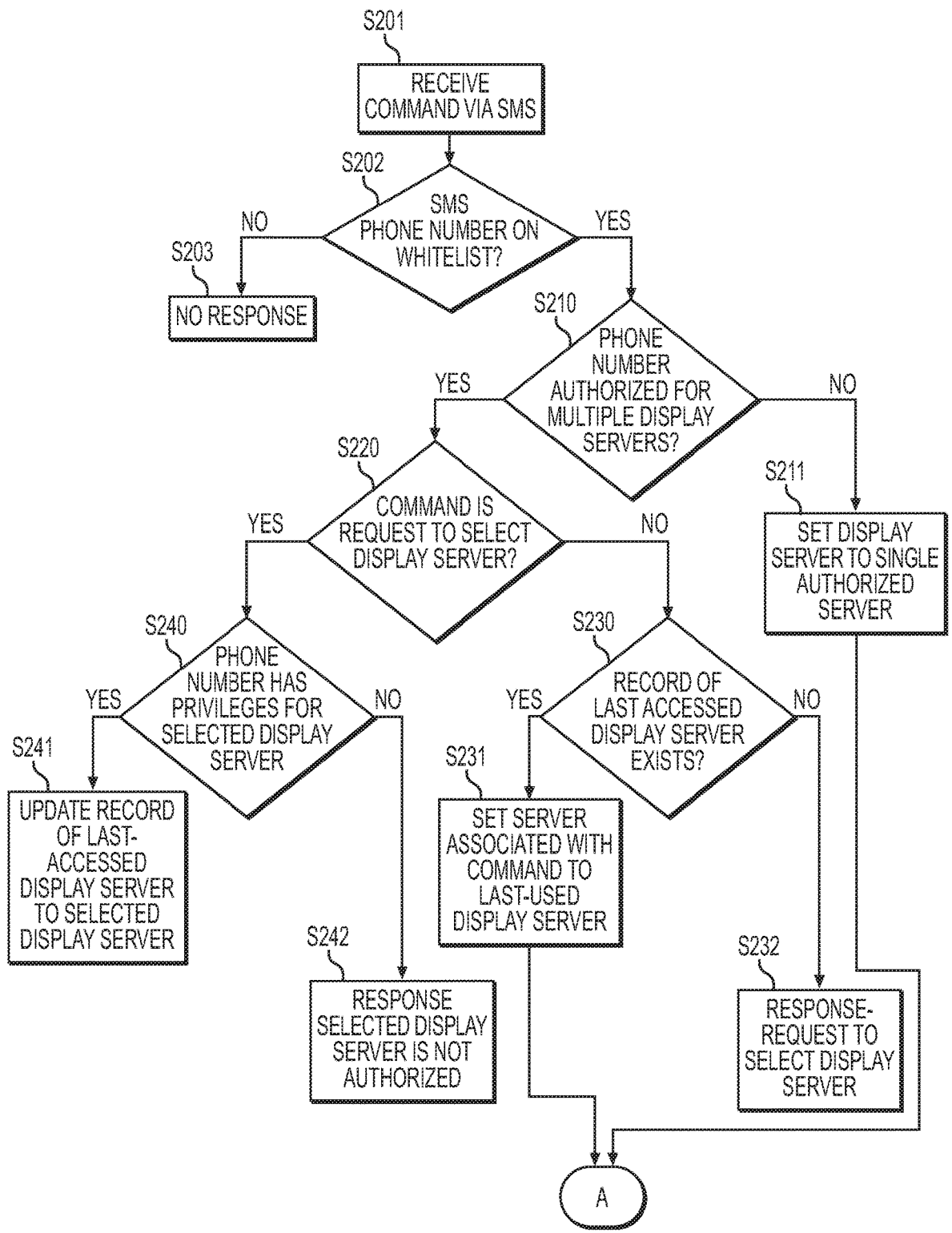
FIGS. 2A and 2B are flow diagrams of a process for remotely administering the electronic display, according to a preferred embodiment of the invention.
Figure 2B:
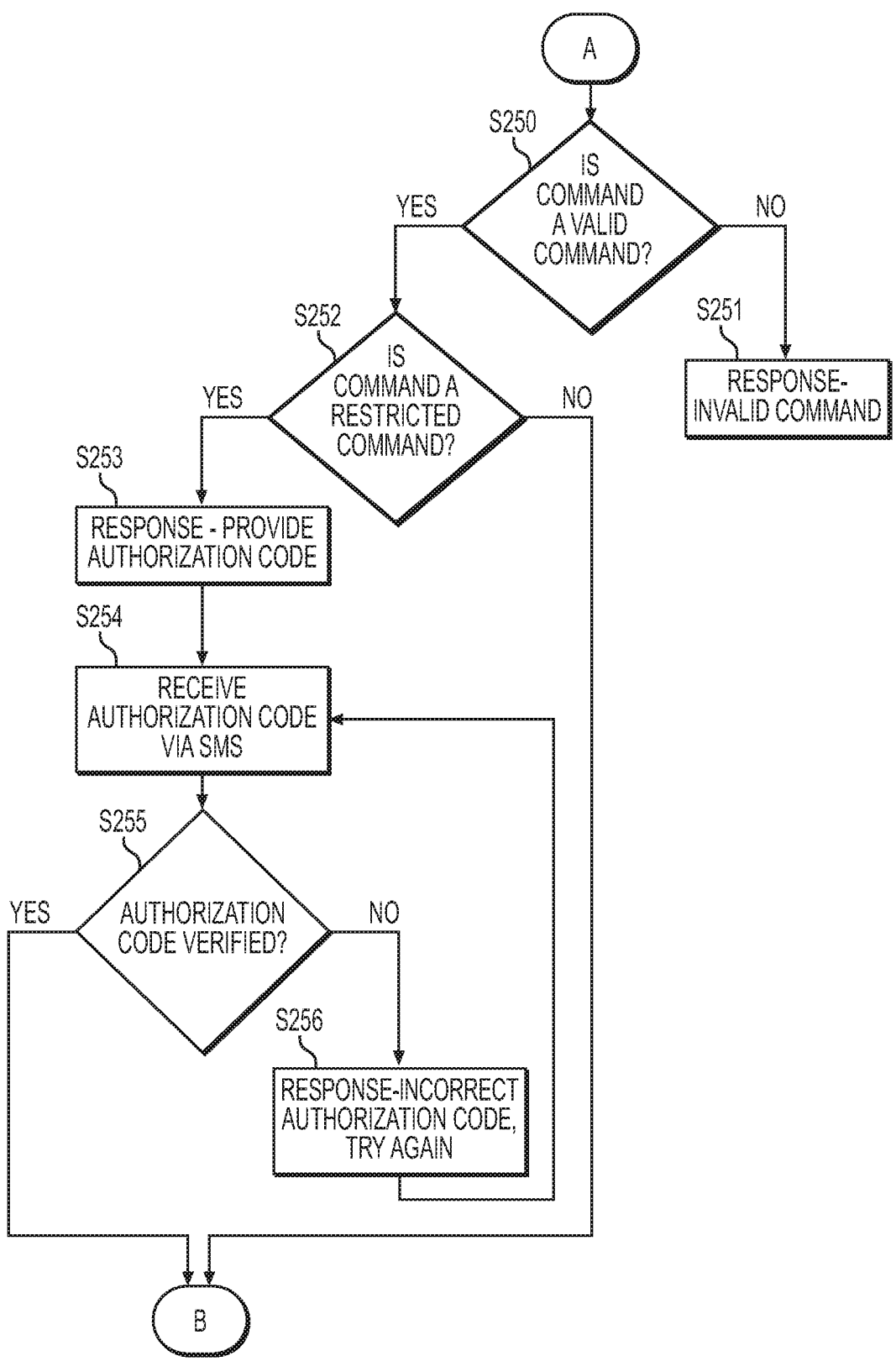

FIGS. 2A and 2B illustrate a process for operating the system 1. In step S201, the backend server 120 receives an SMS message from an SMS-enabled device 100, the SMS message containing an administration command. Preferably, the command is configured based on a preset syntax as the text of the SMS message. However, it will be appreciated that other encoding approaches may be used with the invention, as long as the user is sufficiently familiar with the text needed to submit a desired command.

In step S202, the backend server 120 extracts the sender phone number of the SMS message (for instance, from caller ID information) and compares the phone number against a set of phone numbers (also known as a "whitelist") authorized to interact with the system 1 (e.g., administer over at least one display server 130). Preferably, the whitelist is stored internally within the backend server 120. However, it will be appreciated that the whitelist may be stored externally, such as on an external database. In such circumstance, the backend server 120 accesses the external storage to access the contents of the whitelist and/or perform the authorization check.

If the phone number is not listed on the whitelist (NO in step S202), no response is provided to the SMS-enabled device 100 (step S203) and the process ends. If the phone number is listed on the whitelist (YES in step S202), the backend server 120 proceeds to step S210.

In step S210, the backend server 120 determines whether the phone number is authorized to access more than one display server 130. If the phone number is only authorized to access a single display server 130 (NO in step S210), the process proceeds to step S211. If the phone number is authorized to access multiple display servers 130 (YES in step S210), the process proceeds to step S220.

In step S211, the backend server 120 associates the command in the SMS message with that particular display server 130. The process then proceeds to step S250 to process the administration command contained in the SMS message.

In step S220, the backend server 120 determines if the administration command contained within the SMS message is a request to select a specific display server 130. If the administration command is not such a selection request (NO in step S220), the process proceeds to step S230. If the administration is a selection request (YES in step S220), the process proceeds to step S240.

In step S230, the backend server 120 accesses a table storing the last-accessed display server for each phone number, and determines whether the table includes an entry corresponding to the phone number. In particular, the table contains, for each phone number listed on the whitelist, a record of the specific display server 130 most recently accessed by the phone number. It will be appreciated that instead of a table, this information can be stored in any other data format, such as a database, that is capable of maintaining such information. Preferably, the backend server 120 stores such information internally. However, it will be appreciated that such information can be stored external to the backend server 120, so long as the backend server 120 is able to access the information. Using this information, the system 1 allows commands to default to the most recently accessed display server for that phone number. If the table contains an entry for the phone number (YES in step S230), the process proceeds to step S231. If the table does not contain an entry for the phone number (NO in step S230), the process proceeds to step S232. The latter scenario may occur when, for example, the phone number corresponds to a new administrator that has not previously accessed a display server 130.

In step S231, the backend server 120 associates the command in the SMS message with the specific display server 130 identified in the table. The process then proceeds to step S250 to process the command contained in the SMS message.

In step S232, the backend server 120 transmits an SMS message response to the SMS-enabled device 100, querying the user to select a specific display server.

In step S240, the backend server 120 determines whether the phone number is authorized to manage the specific display server 130 being selected in the request. If the phone number is associated with such authority (YES in step S240), the process proceeds to step S241. If the phone number is not authorized (NO in step S240), the process proceeds to step S242.

In step S241, the backend server 120 updates the table of last-accessed display servers, such that the entry for the phone number identifies the selected display server 130.

In step S242, the backend server 120 transmits an SMS message response to the SMS-enabled device 100, indicating that the user is not authorized to access the selected display server 130.

In step S250, the backend server 120 determines whether the command in the SMS message is a valid command. This operation is preferably accomplished by comparing the command with a set of available commands. If the command is not valid (NO in step S250), the process proceeds to step S251. If the command is valid (YES in step S250), the process proceeds to step S252.

In step S251, the backend server 120 transmits an SMS message response to the SMS-enabled device 100, indicating that the command in the user's SMS message is not valid.

In step S252, the backend server 120 determines whether the command in the SMS message is a restricted command. This operation is preferably accomplished by comparing the command with a set of commands identified as restricted commands. A restricted command is a command requiring an elevated level of authentication. These restricted commands may include, but are not limited to, commands that alter the operation (e.g., updates displayed content) of an electronic display 140 connected to the display server 130. Conversely, unrestricted commands may be commands that do not alter a display's operation, such as a command querying the status of the display. If the command is not a restricted command (NO in step S252), the process proceeds to step S300. If the command is a restricted command (YES in step S252), the process proceeds to step S253.

In step S253, the backend server 120 transmits an SMS message response to the SMS-enabled device 100, querying the user for an authorization code. This authorization code provides the elevated level of authentication, confirming that the user of the SMS-enabled device is the actual authorized administrator. For instance, this additional authentication prevents an unauthorized user from gaining access via caller ID spoofing, unless the user possesses the authorization code.

In step S254, the backend server 120 receives a second SMS message from the SMS-enabled device 100 containing an authorization code. In step S255, the backend server 120 compares the received authorization code with the authorization code corresponding to the phone number, stored in a database. In particular, the database of authentication codes contains, for each phone number listed on the whitelist, a record of the correct authentication code. Preferably, the backend server 120 maintains the database of authentication codes internally, but it will be appreciated that the database may be externally maintained. If the received authorization code matches that in the database, the process proceeds to step S300. If the received authorization code does not match, the process proceeds to step S256.

In step S256, the backend server 120 transmits an SMS message response to the SMS-enabled device 100, notifying the user that the received authorization code was incorrect, and re-queries for the authentication code. The process then returns to step S254. Although not illustrated in FIG. 2B, it will be appreciated that the backend server 120 may be configured to only permit a certain number of incorrect entries of an authentication code before taking more drastic action, such as locking the account corresponding to the phone number or declining to accept further authentication code entries for an amount of time.

Figure 3:
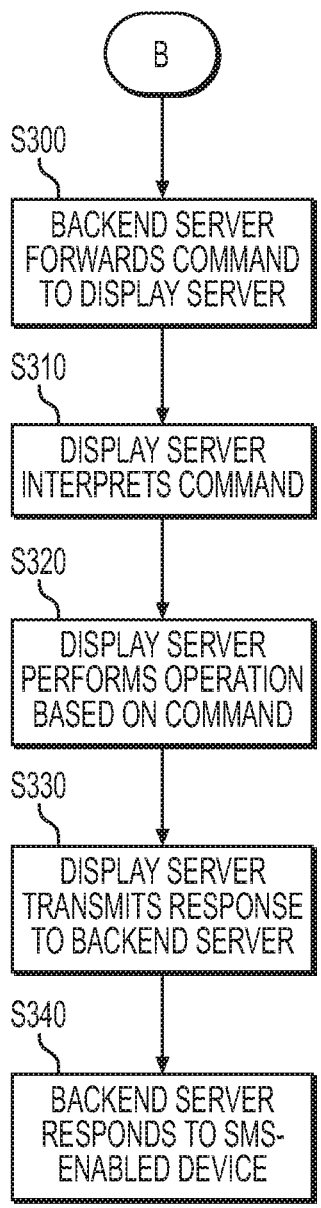
FIG. 3 is a flow diagram of a process for remotely administering the electronic display, according to a preferred embodiment of the invention.

FIG. 3 illustrates a process for processing the command contained in the SMS message received from the SMS-enabled device 100. In step S300, the backend server 120 forwards the command contained in the SMS message to the designated display server 130. It will be appreciated that the forwarded message may not necessarily contain precisely the same data or be in the same format as the command as presented in the SMS message, so long as the relevant information in the command is being provided to the display server 130.

In step S310, the display server 130 receives the command and interprets the command. Preferably, the command includes a base instruction, and may further include one or more parameters. For example, the base instruction may be a "status" instruction to query the status of a display 140. As another example, the base instruction may be a "trigger" instruction to modify the content of a display 140. The parameter(s) of a command may be used to establish more specific aspects of the command. For example, in the case that the display server 130 administers over multiple displays 140, a parameter may designate a specific display 140 to which the underlying instruction is intended. And in the case of a trigger instruction, a parameter may identify specific pre-stored content designated to replace the existing displayed content on the display. Examples of available commands will be explained further below.

In step S320, the display server 130 performs an operation on the corresponding display 140 based on the command. The specific aspects of the performed operation will depend on the particular instruction and/or parameters in the command. For instance, some operations may involve various amounts of communication with the display 140, such as to update the content of the display 140 or to ascertain the operational status of the display 140. However, it will be appreciated that other operations may not necessarily require communication with the display 140. In such instance, this step may be skipped.

In step S330, the display server 130 forms a response to the command and transmits the response to the backend server 120. For example, in the case of a status query, the response may include the obtained status of the display 140. In the case of a command to modify display content, the response may include a confirmation that the display has been so modified.

In step S340, the backend server 120 forwards the response to the SMS-enabled device 100. As with step S300, it will be appreciated that the forwarded response message to the SMS-enabled device 100 may not necessarily contain precisely the same data or be in the same format as the original response to the backend server 120, so long as the relevant information in the response is being provided to the SMS-enabled device 100.

Examples of various administration commands applicable to system 1 will now be described. A first exemplary command is a "help" command. This command educates users on the available commands in the system. A response to this command may include a list of all available instructions. Optionally, the help command may accept a parameter of a specific instruction, in which case the response may provide additional information on the instruction, such as the syntax structure for parameters.

A second exemplary command is a "find" command. This command assists users on searching for a specific display server 130 and/or a particular display 140 within system 1. This command may include one or more parameters in the form of a display (or display server) name or location for searching within the system 1. A response to this command may include a list of all available display servers 130 to which the corresponding phone number is authorized, a list of all available displays 140 to which the corresponding phone number is authorized, and/or other responsive information.

Yet another exemplary command is a "status" command. This command queries the status of a specific display server 130 and/or a specific display 140. This command may include one or more parameters in the form of the specific display server 130 and/or display 140 being the subject of the status query. A response to this command may include the operational status of the corresponding display server 130 and/or display 140, including whether the component is operating correctly, identification of the content currently being displayed on a display, and/or other operational information.

Another exemplary command is a "trigger" command. This command updates the operation of a display server 130 and/or a display 140 in a particular manner. This command may include one or more parameters indicating the nature of the operation update. For instance, one parameter may designate one set of content already stored on the display server 130 and/or the display 140, to which a display should then display. Or, one parameter may designate actual text to display on a display 140. Another parameter may designate a length of time to which updated content is to be displayed, before reverting to other content. A response to this command may include a confirmation that the operation of the display server 130 and/or display 140 has been updated, or otherwise an error if such updating has not been accomplished.

Preferably, at least the trigger command is a restricted command requiring entry of a correct authorization code before being performed, as described with respect to FIGS. 2A and 2B. However, it will be appreciated that any or all of the commands available on the system 1 may require entry of an authorization code before being performed.

Preferably, a command is formed as a text string containing the specific instruction, followed by one or more optional parameters. For example, an SMS message may formed as the text "STATUS *BASEBALL-2". The "STATUS" text designates the specific instruction, while "*BASEBALL-2" may designate a specific display 140 (e.g., the second display on a baseball field managed by an administrator). A response to such SMS message may be "*BASEBALL-2: Welcome!" which indicates that the specific display 140 is currently displaying the text "Welcome!". Of course, it will be appreciated that the format and content of the messages may be configured in various manners which still fall within the scope of the invention.

The invention described above provides extended control of content/media displayed on individual and groups of digital signs for use in near realtime scenarios by leveraging SMS as a transport mechanism to enable immediate temporary or permanent changes to displayed content/media shown on digital signage.

The embodiments discussed herein are examples of preferred embodiments of the present invention and are provided for illustrative purposes only. They are not intended to limit the scope of the invention. Although specific configurations, structures, materials, etc. have been shown and described, such are not limiting. Modifications and variations are contemplated within the scope of the invention, which is to be limited only by the scope of the issued claims.

What is claimed is:

1. An apparatus for controlling a display, comprising:
a processor;
at least one network interface; and
a memory,
wherein the processor is configured to:
receive, from a client device via the at least one network interface, a first message containing text content, the text content representing an administration request to perform an administration function on the display, the administration request being one of at least two types including a first type and a second type,
extract identifying information of the client device from the first message,
compare the identifying information to a whitelist,
determine, based on the comparing, whether or not the client device is an authorized device,
when the client device is determined to be an authorized device and the administration request is of the first type:
transmit, to the client device via the at least one network interface, a second message requesting verification of an administrator,
receive, from the client device via the at least one network interface, a third message containing content to verify the administrator,
determine whether or not the administrator is verified, based on the third message, and
transmit, if the administrator is verified based on the third message, a command to perform the administration function on the display in accordance with the administration request, and when the client device is determined to be an authorized device and the administration request is of the second type:
transmit the command to perform the administration function on the display in accordance with the administration request, without determining whether or not the administrator is verified.

2. The apparatus of claim 1, wherein the at least one network interface includes a cellular network, and
wherein the first, second, and third messages are SMS or MMS messages.

3. The apparatus of claim 1, wherein if the user of the client device is not verified as an administrator based on the third message, the processor is configured to transmit, to the client device via the at least one network interface, a fourth message indicating an administrator verification failure.

4. The apparatus of claim 1, wherein the command to perform the administration function on the display, in accordance with the administration request, is transmitted to a server corresponding to the display, and
wherein the server performs the administration function on the display in accordance with the command.

5. The apparatus of claim 1, wherein a request to control the display falls within the first type, and
wherein a request for the status of the display falls within the second type.

6. The apparatus of claim 1, wherein the identifying information is a device identifier corresponding to the client device.

7. The apparatus of claim 6, wherein the device identifier is a caller ID, and the whitelist is a set of phone numbers.

8. The apparatus of claim 1, wherein the processor is configured to track an elapsed time from a determination that an administrator is verified,
wherein when the processor receives a second administration request from the client device and the elapsed time has not exceeded a predetermined threshold, the processor is configured to transmit the command to perform the administration function on the display in accordance with the administration request, without determining whether or not the administrator is verified and regardless of whether the second administration request is of the first type or the second type, and
wherein when the processor receives the second administration request from the client device and the elapsed time has exceeded a predetermined threshold, the processor is configured to require that the administrator be re-verified.

9. The apparatus of claim 1, wherein the text content of the first message is formatted according to a predetermined protocol, and
wherein the predetermined protocol includes a command and at least one variable.

10. The apparatus of claim 1, wherein (i) a request to display content on the display for a length of time and thereafter display different content on the display, and (ii) a request to display content on the display until the displayed content is changed by a subsequent request, are included among the available administration requests.

11. The apparatus of claim 1, wherein if the client device is determined not to be an authorized device, the processor is configured to not respond to the first message.

12. The apparatus of claim 1, wherein the processor performs the extracting, comparing, and determining whether or not the client device is an authorized device, in response to receiving the first message.

13. A method for controlling a display, comprising:
receiving, from a client device via at least one network interface, a first message containing text content, the text content representing an administration request to perform an administration function on the display, the administration request being one of at least two types including a first type and a second type;
extracting identifying information of the client device from the first message;
comparing the identifying information to a whitelist;
determining, based on the comparing, whether or not the client device is an authorized device,
when the client device is determined to be an authorized device and the administration request is of the first type:
transmitting, to the client device via the at least one network interface, a second message requesting verification of an administrator,
receiving, from the client device via the at least one network interface, a third message containing content to verify the administrator,
determining whether or not the administrator is verified, based on the third message, and
transmitting, if the administrator is verified based on the third message, a command to perform the administration function on the display in accordance with the administration request, and
when the client device is determined to be an authorized device and the administration request is of the second type:
transmit the command to perform the administration function on the display in accordance with the administration request, without determining whether or not the administrator is verified.

* * * * *